United States Patent Office 2,963,328
Patented Dec. 6, 1960

2,963,328

ANTI-SKID CONTROL SYSTEM

René Lucien, Neuilly-sur-Seine, France, assignor to Société à responsabilité limitée: Recherches Etudes Production, Paris, France, a corporation of France Filed Nov. 29, 1957, Ser. No. 699,643

Claims priority, application France Sept. 18, 1957

3 Claims. (Cl. 303—24)

The invention relates to devices which are intended to insure automatic control of the braking, by fluid under pressure, of wheels of vehicles—such as aircraft, automobiles and the like—and which are of the type in which an inertia fly-wheel or its equivalent, responsive to decelerations of the wheel caused by the braking action is combined with a switching member controlling the fluid circuits such as, for example, an electro-valve or a mechanical distributor inserted in the braking circuit.

When the deceleration of a wheel subjected to braking reaches an excessive value which is likely to cause skidding of the wheel, known controlling devices can be provided which act so as to put the fluid conduit which supplies the brake with pressure fluid into communication with a reservoir. The braking action is thus momentarily interrupted until deceleration again becomes normal, and this action takes place even if the driver continues to act on the brake pedal.

Experience has shown that it would be an advantage to give the pilot or the driver the sensation of operating the braking controller. In accordance with the invention, this result is obtained when the controller is in action to release the braking, by impressing on the actuating pedal small pulsations in the direction which tends to lift this pedal, that is to say which tends to give precisely the same action of braking release which is applied at the same moment by the controller.

A particularly simple means of generating these pulsations—and this in itself constitutes a special feature of the invention—consists of connecting in shunt to the return piping system connecting the switching member of the fluid circuits to the reservoir, a small piston-and-cylinder device mounted on the operating pedal and combined with a restrictor interposed in the said piping system.

Figure 1:
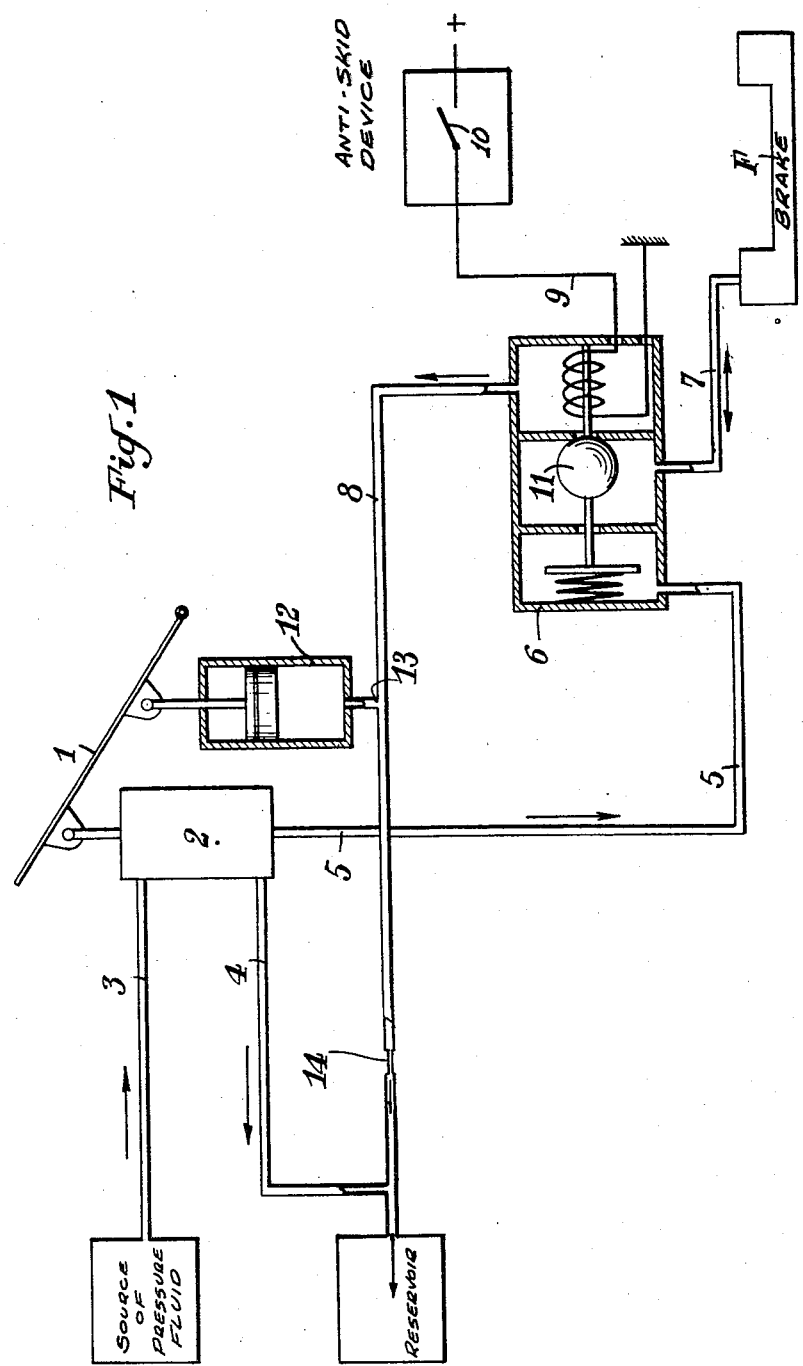
Figure 2:
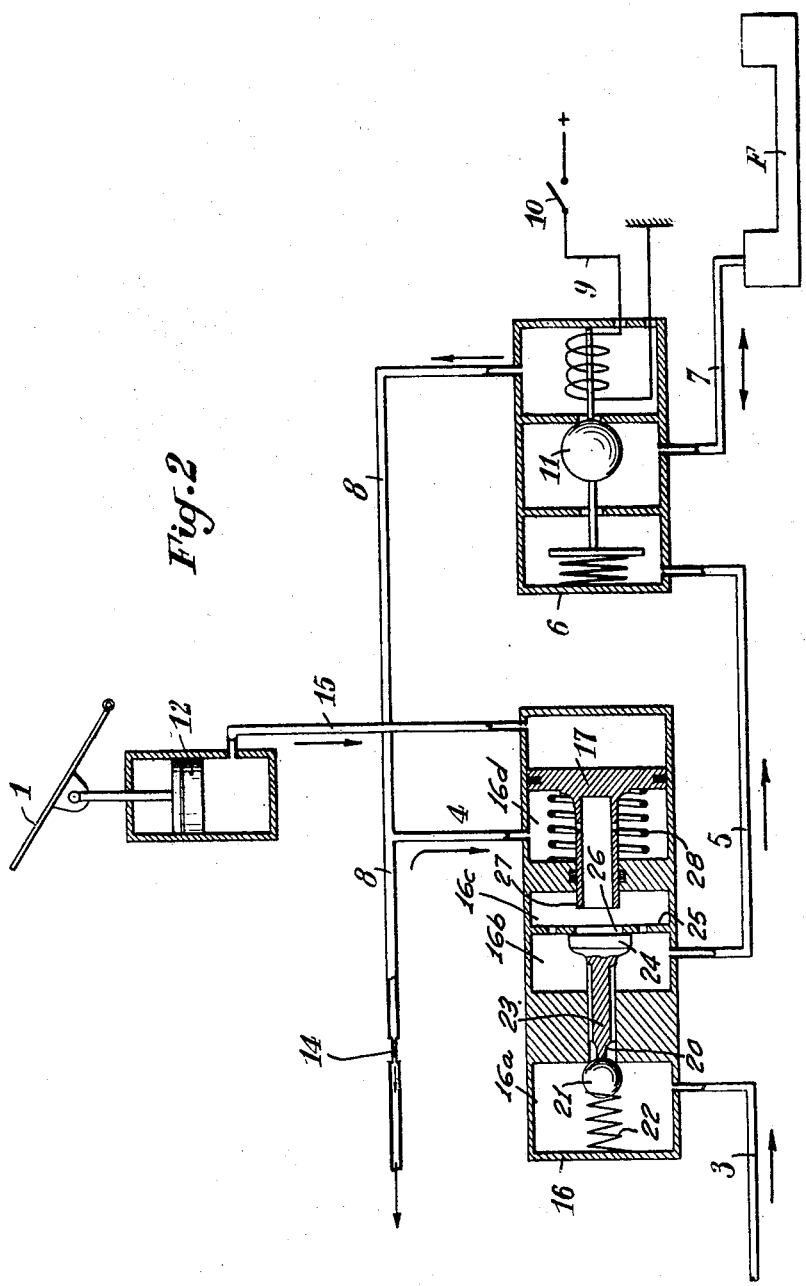

Fig. 1 of the accompanying drawings illustrates the invention diagrammatically in association with a switching member, which is an electro-valve; and Fig. 2 illustrates a further embodiment of the invention.

In Figure 1, the conventional elements of braking controllers of the kind referred to are illustrated. The brake pedal 1 acts on a distributor 2 coupled through the conduit systems 3, 4 and 5 respectively to the source of fluid under pressure which is employed to actuate the brake F, to the reservoir, and to the electro-valve 6, which is itself connected to the brake F and to the reservoir respectively by the piping systems 7 and 8. The electro-valve is itself operated by an electric circuit 9, controlled by the anti-skid device or deceleration responsive means including switch 10.

During periods of normal braking, the action of the pilot or the driver on the pedal 1 has the effect of admitting the fluid under pressure through the distributor 2 into the piping system 5 and into the electro-valve, the ball-valve 11 of which is applied against its right-hand seating to permit access of the pressure to the brake through the pipe 7. In the event of excessive deceleration of the wheel, causing skidding of this wheel, the accelerometer excites the coil of the electro-valve; the ball 11 is applied against its left-hand seating, which isolates the brake from the pressure pipe 5 and connects it to the reservoir through the piping systems 7 and 8; this is the braking-release system.

The invention contemplates connecting on the return piping system 8 of these braking controllers, a small piston-and-cylinder device 12, the piston of which is coupled to the pedal 1, and in inserting in this return piping system, on the downstream side of the point of connection 13 of the device 12, a restriction 14 which is a conventional type of restrictor.

By virtue of this combination of the device 12 and the restriction 14, at every operation of the switching member 6 causing the release of the brake F, the small quantity of fluid set free towards the reservoir through the conduit 8 and passing through the restriction 14, creates in this conduit an increase of pressure which causes the pressure to rise in the body of the device 12, thus giving to the brake pedal an impulse which can be felt by the pilot; the latter is thus warned that the braking controller is in action at that moment to release the braking. As he is thus warned that the wheel is on the verge of skidding, the pilot can then ease his action on the pedal.

Fig. 2—in which the parts which have the same functions as in the previous example have been given the same reference numbers—the device 12, which gives the sensation of braking-release to the pilot serves at the same time as a braking-transmitter, by coupling the pedal 1 through a piping system 15 to a braking relay 16. The latter may be of any suitable type, the operation of which will be easily understood.

More particularly, the relay 16 defines chambers 16a, 16b, 16c and 16d. Chamber 16a is coupled via line 3 to the source of fluid pressure, and chamber 16b is coupled via line 5 to switch 6. Chambers 16a and 16b are coupled by bore 20, one end of which accommodates a ball 21 which is spring-loaded by spring 22.

Extending through bore 20 is a rod 23 which abuts axially against ball 21 so as to be able to unseat the latter and thus couple lines 3 and 5.

Rod 23 is provided with a head 24 which seats against a partition 25 provided with an aperture 26. Through aperture 26 can extend a rod 27 of a piston 17 spring-loaded by a spring 28.

Piston 17 divides chamber 16d into two sections respectively coupled to line 4 and line 15. When brake pedal or control 1 is employed to actuate device 12, pressure on the right-hand side of piston 17 forces the latter to the left so that through the intermediary of rods 27 and 23, ball 21 is displaced. Fluid pressure is, therefore, connected via lines 3 and 5 to switch 6, the operation of which has been explained above.

When the switch 6 diverts the pressure fluid back along line 8 to restriction 14 which conventionally provides a back pressure, this back pressure is fed via line 4 into chamber 16d to the left of piston 17, the latter transmitting the pressure via line 15 and through the device 12 to the pedal 1 thereby indicating to the operator that switch 6 is by-passing the brake F.

The structures of Figs. 1 and 2 have in common the fact that the by-passing of the switch 6 is manifested in the form of a pressure at the pedal 1. This novel provision permits an operator to feel completely the functioning of the associated apparatus.

There will now be obvious to those skilled in the art many modifications and variations of the structures set forth. These modifications and variations will not, however, depart from the scope of the invention as defined in the following claims.

What I claim is:

1. In an anti-skid system for braking the wheel of a vehicle and of the type having a source of pressure fluid, a reservoir, a brake, means responsive to deceleration of said wheel, valve means coupled to said source and adapted for being coupled selectively to said brake and to said reservoir, a switch in the first said means for controlling said valve means to selectively couple said source to said brake and to said reservoir, and a control coupled between said source and valve means for controlling pressure transmitted to said brake; an indicator comprising a piston-and-cylinder device connected between said valve means and reservoir, a restrictor connected between said device and said reservoir to create a pressure to which said device responds, and means connecting said device to said control whereby said control responds to pressure caused by said restrictor.

2. In a system as claimed in claim 1, said control being a distributor adapted to connect the source to the valve means and the latter said means being a foot pedal.

3. In a system as claimed in claim 1, the latter said means being a conduit coupling said device and control, said control being a relay operatively connected to said valve means, foot pedal and the restrictor for transmitting pressure from the latter through said device to said foot pedal.

References Cited in the file of this patent

UNITED STATES PATENTS

| | | |
|---|---|---|
| 2,718,938 | Berkoben | Sept. 27, 1955 |
| 2,868,338 | Lucien et al. | Jan. 13, 1959 |